(12) United States Patent
Yáñez Castañeda

(10) Patent No.: US 12,325,924 B2
(45) Date of Patent: Jun. 10, 2025

(54) SYSTEM AND DEVICE FOR OPTIMIZING METAL ELECTRODEPOSITION

(71) Applicant: Percy Danilo Yáñez Castañeda, Antofagasta (CL)

(72) Inventor: Percy Danilo Yáñez Castañeda, Antofagasta (CL)

(*) Notice: Subject to any disclaimer, the term of this patent is extended or adjusted under 35 U.S.C. 154(b) by 134 days.

(21) Appl. No.: 17/767,868

(22) PCT Filed: Oct. 7, 2020

(86) PCT No.: PCT/CL2020/050115
§ 371 (c)(1),
(2) Date: Apr. 8, 2022

(87) PCT Pub. No.: WO2021/068090
PCT Pub. Date: Apr. 15, 2021

(65) Prior Publication Data
US 2024/0084471 A1    Mar. 14, 2024

Related U.S. Application Data

(60) Provisional application No. 62/913,448, filed on Oct. 10, 2019.

(51) Int. Cl.
C25C 7/04        (2006.01)
C25C 1/00        (2006.01)
(Continued)

(52) U.S. Cl.
CPC ............... C25C 7/04 (2013.01); C25C 1/00 (2013.01); C25C 1/12 (2013.01); C25C 7/08 (2013.01);
(Continued)

(58) Field of Classification Search
CPC ...................................................... C25C 7/04
See application file for complete search history.

(56) References Cited

U.S. PATENT DOCUMENTS 1,609,771 A * 12/1926 Poland ............... C25C 7/04
                                                    205/152
3,997,421 A * 12/1976 Perri ................. C25C 7/04
                                                    204/267
(Continued)

FOREIGN PATENT DOCUMENTS

CL        199803164 A       11/1999
CL         58159 B1          3/2017
(Continued)

OTHER PUBLICATIONS

Machine translation of WO-2017193225-A1 (Year: 2017).*
International Search Report and Written Opinion dated Jan. 8, 2021, from application No. PCT/CL2020/050115, 10 pages.

*Primary Examiner* — Harry D Wilkins, III
(74) *Attorney, Agent, or Firm* — Foley & Lardner LLP

(57) ABSTRACT

Optimizing device for the electrodeposition of metals which covers the entire range of electrodeposition of metals from the lowest current densities to the highest, which has multiple openings on its entire surface which maximize the free passage of the electrolyte flow without altering the electrodeposition processes and straightening the electrodes causing an equidistribution of current in the electrodes installed in the cells which leads to the production of cathodes with high quality uniform deposits avoiding the loss of current due to short circuits that occur between anodes and cathodes, thereby increasing the current efficiency of the system. The device comprises a single body with a firm skeletal structure formed by different body sections, at least one body section comprising inclined side walls.

25 Claims, 11 Drawing Sheets

(51) Int. Cl.
  *C25C 1/12* (2006.01)
  *C25C 7/08* (2006.01)
  *C25D 5/08* (2006.01)
  *C25D 17/00* (2006.01)
  *C25D 21/12* (2006.01)

(52) U.S. Cl.
  CPC ............... *C25D 5/08* (2013.01); *C25D 17/00* (2013.01); *C25D 21/12* (2013.01)

(56) References Cited

U.S. PATENT DOCUMENTS

| | | | | |
|---|---|---|---|---|
| 4,619,751 A | * | 10/1986 | Robinson | C25C 7/04 204/267 |
| 5,762,776 A | * | 6/1998 | Alexander | C25D 17/00 204/267 |
| 6,483,036 B1 | * | 11/2002 | Santoyo | C25C 7/04 174/146 |
| 2004/0020765 A1 | * | 2/2004 | Tanaka | C25C 7/02 204/286.1 |
| 2008/0302654 A1 | * | 12/2008 | Yanez Castaneda | C25C 7/06 204/232 |
| 2016/0160375 A1 | * | 6/2016 | Yanez Castaneda | C25C 7/00 204/297.01 |
| 2019/0078223 A1 | * | 3/2019 | Yanez Castaneda | C25C 7/02 |
| 2020/0181786 A1 | * | 6/2020 | Yañez Castañeda | C25C 7/08 |

FOREIGN PATENT DOCUMENTS

| | | |
|---|---|---|
| CL | 201902623 A1 | 3/2020 |
| DE | 10196340 B3 | 8/2012 |
| WO | WO-2015/010220 A2 | 1/2015 |
| WO | WO-2017193225 A1 * | 11/2017 |
| WO | WO-2019161514 A1 * | 8/2019 |
| WO | WO-2020074768 A1 * | 4/2020 |

* cited by examiner

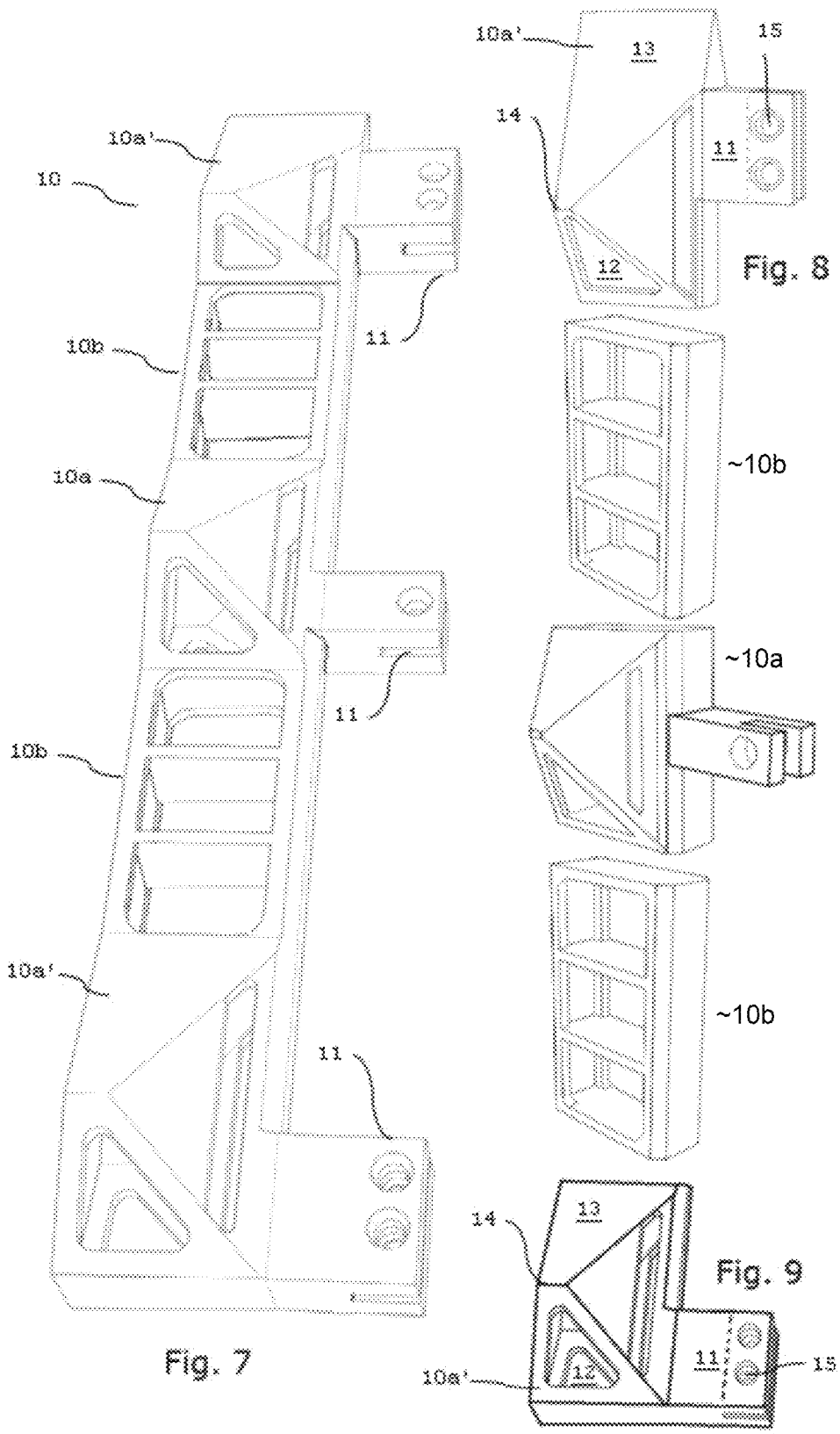

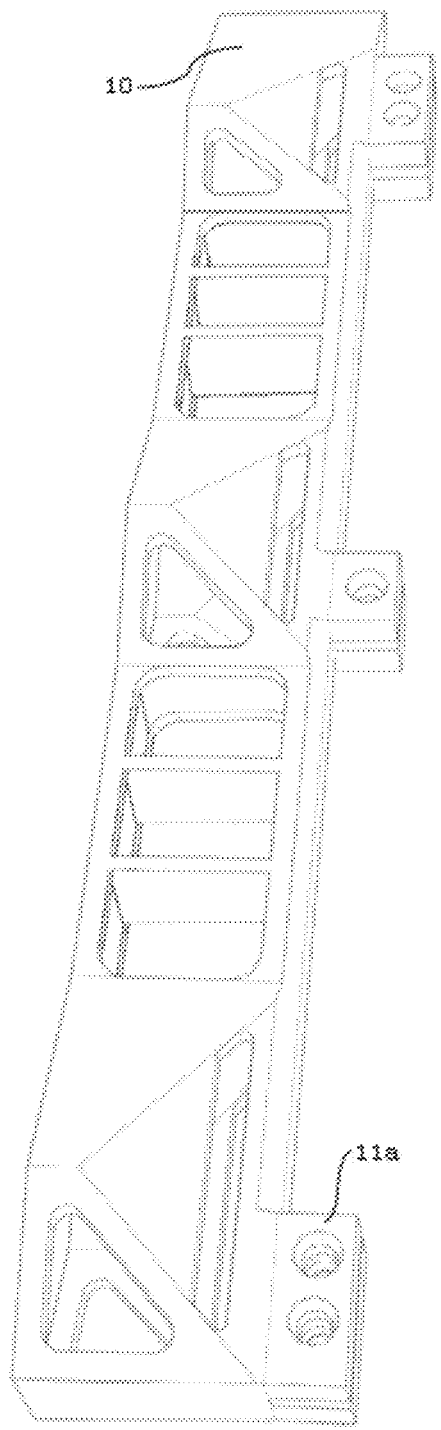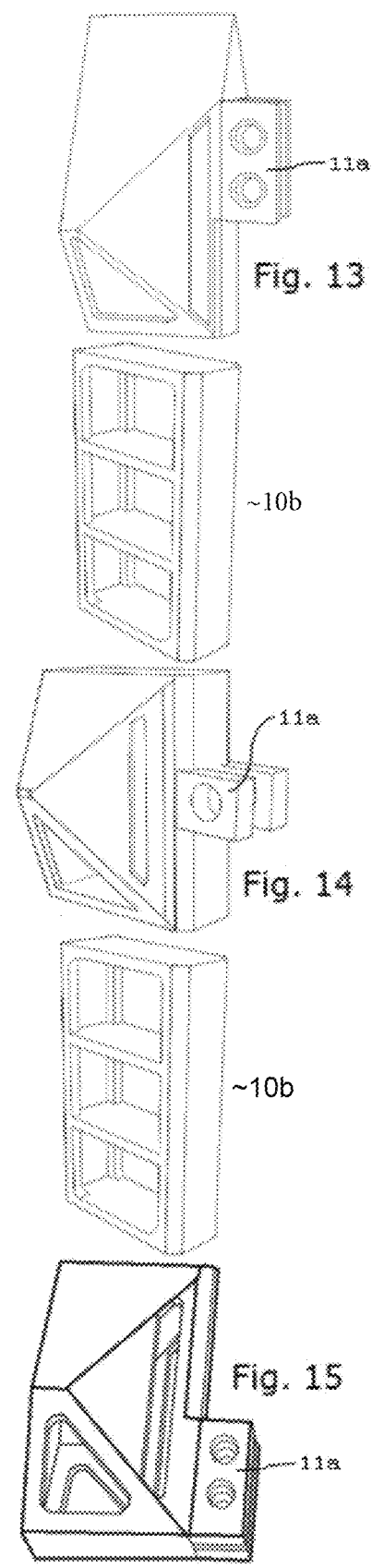
Fig. 12
Fig. 13
Fig. 14
Fig. 15

SYSTEM AND DEVICE FOR OPTIMIZING METAL ELECTRODEPOSITION

This application is a U.S. national Stage Application under 35 U.S.C. § 371 of International Patent Application No. PCT/CL2020/050115, filed Oct. 7, 2020, which claims the benefit under 35 U.S.C. § 119(e) of U.S. Provisional Application No. 62/913,448, filed Oct. 10, 2019, the contents of each of which are incorporated by reference in their entireties.

The present Application relates to an optimizing system for the electrodeposition of metals, capable of operating in a wide range of current densities, from the lowest to the highest, preferably in electrolytic processes.

The system is made up of optimizing devices that have multiple openings on their entire surface which facilitates the passage of the metal-rich electrolyte promoting the electrodeposition of the metal in the area just where the device is housed in the anode obtaining metallic cathodes with a uniform deposit. In addition, the device manages to straighten and separate the anodes as much as possible.

The system includes at least one electrodeposition optimizing device preferably plastic which improves the equal distribution of current in the electrodes and consequently increases the efficiency of the electrical current of the system avoiding current loss due to short circuits. With this, the anodes last longer in operation increasing the physical quality of the entire production and practically reducing rejects due to nodulation to zero. Consequently, the entire percentage of rejection is converted into an increase in the production of the metallic cathodes obtained.

In addition, said system and device is installed along the sides of each anode solving part of the main existing problems in electrolytic processes.

BACKGROUND OF THE INVENTION

It is known that, during the electrolytic processes for the production of metallic cathodes, for example by electrowinning and electrolytic refining, initially flat, straight or vertical anode plates are used. Such anodes, mainly made of lead or any other material suitable for the process undergo degradation due to the corrosive action of the hot acid electrolyte in which they are submerged. In this context, during the operation of an electrolytic cell, the anodes oxidize producing a thinning of the anode as a result of the gradual detachment of the oxide that forms on its surface. Then, when losing thickness, the properties of the anodic plates change, among them their mechanical properties remain susceptible to deformation, for example buckling in a concave shape losing its original verticality.

Deformation of the anode results in an inefficient operation of the anode, since a deformed anode tends to reduce its separation or simply to join with respect to one or both of the adjacent cathodes. Said reduction in separation or contact facilitates the production of short circuits in the cathodes to be harvested which give rise to nodules, malformations or protuberances generating losses in the production of cathodes due to nodulation and losses in the efficiency of the current.

Additionally, once the conditions of degradation and deformation of the anode have occurred corrosion increases and the thinning of the plate also increases which causes greater deformation and even greater loss of cathode production and current efficiency. This process of degradation of the anode culminates in the corners of the anode plates, due to their thinning they start bending even more until it is finally necessary to change the affected anode plate(s).

In this context, the anodes that are currently used in the electro-winning or electro-refining processes, with the use and corrosion by the hot acid electrolyte, corrode, thin and deform, losing their verticality and, as a consequence, generating micro short circuits due to the approach of these with one or both adjacent cathodes. This results in nodulations or protuberances in the electro-deposited plates thereby producing a loss of current efficiency and a rejection of the plates harvested by nodulation, added to the fact that with greater use the degradation of the anode is accentuated which forces many times to the premature replacement of the affected anode or group of anodes.

In this context, various solutions have ventured into improving the properties of the anode to reduce the effects that the electrolytic medium has on such component. Then, anodes have been designed with titanium alloys or other materials that although they manage to increase their useful life, they make their use significantly more expensive. Therefore, a solution is required that allows to increase the useful life of the anode regardless of its composition while reducing the effects of its degradation on the production and quality of the cathodes.

In this regard, there are methods designed to stiffen the new anodes such as the one described in the Patent Application CL 778-1996. This application describes a method in which by means of large-scale machines such as hydraulic presses, figures are stamped with great mechanical pressure exerted on the entire surface of the anode printing various shapes on the plates stiffening them. Then, when said plates come into operation they remain rigid for a longer period of time than that of a plate without stamping, partially solving the problem stated above. However, a great disadvantage of the solution proposed by the Application CL 778-1996 is that once the corrosion of one or more anodes begins they lose thickness being unavoidable their deformation or buckling, triggering the problems posed previously, that is, producing poor quality cathodes, loss of current efficiency and consequently, the corresponding rejection of the cathodes due to nodulation.

Another type of solutions found in the art correspond to huge systems about the size of the electrolytic cell where said systems separate the anodes from the cathodes equidistantly using channel-shaped guides, so that the anodes and cathodes move vertically. Said guide devices, which are applied when the mother cathodes do not use edge covers, work well when the anodes and cathodes are perfectly vertical, that is, while they are new. However, as soon as the anodes begin to be used, they anyway begin to corrode, lose thickness and deform, according to what has been stated above the same thing happens with the mother cathodes. Then, when the extraction of the deformed anodes and/or cathodes is required the displacement guides become an obstacle making the operation inefficient, since the deformation of the electrodes due to their use makes it difficult for them to slide along said guides. Therefore, the disadvantages of this system are its high implementation cost, added to the fact that the guide channels do not straighten or stiffen the anodes when they deform. In this context, a solution is required which in addition to give rigidity to the anodes, allows both the cathodes and anodes to be extracted from the cell and inserted without interruptions.

On the other hand, in various documents such as U.S. Pat. Nos. 5,762,776, 4,619,751 and 3,997,421, separator and/or insulator devices are described to be located on the surface of the anode, both in the lower third of it, on its sides, in its central part or in a combination of the previous positions allowing to maintain a specific separation between anodes and cathodes reducing both the risks of short circuits and current efficiency losses. Said devices are installed on the anodes to provide contact and sliding surfaces which maintain a uniform distance between the anodes and the adjacent cathodes in addition to facilitating the insertion and extraction of the electrodes during the common operations carried out in electrolytic systems. However, when corrosion begins and consequent thinning and deformation of the anodes these devices only allow to mitigate the effects of buckling, that is, without stiffening the anodes, so short circuits occur in the same way when the anodes degrade and consequently, they become deform.

As can be derived from the above, in order to reduce deformation, increase the quality and production of cathodes, where they are free of nodulation, as well as to increase current efficiency and increase the useful life of the anode, it is necessary to maintain vertical the anodes and ensure the maximum distance between anode and cathode throughout their length. However, traditional separation systems do not contemplate how to avoid buckling of the anodes integrally, they are only limited to mitigate the effects of buckling with the use of separators as a secondary objective. An example of the above is that the percentage of rejections of electro-obtained cathodes with these separation systems is in a range between 4 and 7%, undesirable factors for the high production rates managed currently. Furthermore, the use of said solutions as in document WO2015010220 usually results in a reduction of the ore deposit on the cathode mainly in the areas close to or in contact with the separation systems installed on the anodes.

Therefore, the main problem that the present invention solves is to promote the electrodeposition of the cathodes just in the areas where the device is housed in the anode and this is due to the multiple openings that the device has to facilitate the passage of the electrolyte. In addition, it straightens the anodes keeping them parallel avoiding buckling, managing to maintain the greatest distance between anode and cathode throughout its length equidistantly producing an equal distribution of the current in all the cathodes avoiding short circuits. Consequently, the current efficiency of the system increases, practically reducing rejections due to nodulation to zero which reach up to 7% of rejections, therefore, improving the quality of all the cathodes produced, increasing the production of cathodes in the same percentage of rejections.

DESCRIPTION OF THE INVENTION

As stated above, the devices known in the art make it possible to partially solve the problems derived from the deformation of the anodic plates, that is, to maintain rigid and completely vertical anodes at the same time that there is an equidistant separation between them and the cathodes, avoiding short circuits and formation of nodulations that affect the quality and production of electro-deposited electrodes.

What the stiffeners of document WO 2015010220 do not solve are the non-deposits or partial deposit of the metal to be deposited on the cathodes just in the areas where the stiffeners are installed on the anodes preferably when operating with low current densities.

In view of the above, the present invention suggests a system and device that optimizes the electrodeposition of metals which, due to the multiple openings it has, maximizes the passage of the electrolyte flow without altering the electrodeposition processes preferably at low densities of current. This allows a uniform deposit on the entire surface of the cathode and straightens the electrodes avoiding the loss of current due to short circuits that occur between anodes and cathodes which translates into an increase in the current efficiency of the system.

The device consists of a single body skeletally firm in structure made up of body sections, in particular a body section with sloping side walls, for example, U-shaped in cross-section wider at its rear followed by a body section with parallel walls which configures a narrower cross section, for example, U-shaped repeating this configuration of body sections alternately throughout the extension of the device until reaching a desired length, for example, the length of the lateral edge of an anode stiffening and increasing its current efficiency throughout the length of the anode. The side walls of the body have multiple openings of various shapes that facilitate the passage of the electrolyte flow, such walls meet on the front face of the device forming a wall that supports the wedge area arranged to accommodate, adjusted and displaced from this wall, the peripheral edge of an electrode preferably of an anode straightening it along its entire length and separating it from adjacent electrodes. The body sections with sloping walls form separation sections to maintain the separation between adjacent electrodes and the body sections with parallel walls form circulation sections to promote the circulation of the electrolyte.

As a result of these characteristics, the system and optimizing device of the electrolyte flow of the invention allows solving the problems of the prior art thanks to the disappearance of non-deposits of metal in the areas where both the already existing separators and stiffeners are installed affecting an increase in the efficiency of the electrolytic cells of at least 2% which then leads to the production of more high-quality cathodes without nodulation.

The most important advantage of the invention compared to the state of the art is that the characteristics of the system and device allow optimizing the electrodeposition of the cathodes, even at low current densities by facilitating the passage of the electrolyte flow, in addition simultaneously, straightens the anodes and maximizes the distance between anodes and cathodes achieving an equal distribution of current in the electrodes, resulting in metallic cathodes with uniform deposits and surfaces without nodulations without rejections due to areas without deposits, preferably when the process is with low current density.

The foregoing causes an increase in current efficiency of at least 2%, increases production by the same percentage of rejected cathodes which can reach up to 7% increasing the physical and chemical quality of all harvested cathodes, added to the extension of the useful life of the anodes in at least 1 year a sufficient period that allows gradually changing the old anodes for new ones without reducing the cathodic quality.

Therefore, the present invention consists on an optimizing device for the electrodeposition of metals with multiple openings which maximizes the passage of the flow of the electrolyte without altering the electrodeposition processes which is suitable for the entire range of current density. In addition, the invention also consists on the incorporation of said optimizing device in an optimizing system that promotes the electrodeposition of metals, in all ranges of current densities. In addition to verticalizing and keeping the anodic plates straight throughout their extension the device and system allow maintaining an equidistant separation along the entire length of the anode with respect to the adjacent cathodes obtaining an equal distribution of current in all the cathodes, increasing the efficiency of the system current. Finally, said system and device allow obtaining cathodes with uniform deposits and without nodulations in addition to increasing the useful life of the anodes by avoiding their deformation as a result of the constant degradation that they undergo during the operation in the acid medium.

BRIEF DESCRIPTION OF THE FIGURES

As part of the present invention, the following representative figures are presented which show preferred embodiments of the invention and therefore, should not be considered as limiting the definition of the claimed matter.

FIG. 7 shows a full isometric view of the optimizing device of FIG. 1.

FIG. 8 shows an isometric view of an upper separation section of the optimizing device body of FIG. 1.

FIG. 9 shows an isometric view of the lower separation section of the optimizing device body of FIG. 1.

FIG. 12 shows a full isometric view of an optimizing device with unextended wedge areas.

FIG. 13 shows an isometric view of an upper separation section of the optimizing device body of FIG. 12.

FIG. 14 shows an isometric view of a central separation section of the optimizing device of FIG. 12.

FIG. 15 shows an isometric view of the lower separation section the optimizing device body of FIG. 12.

DETAILED DESCRIPTION OF THE FIGURES

Figure 1:
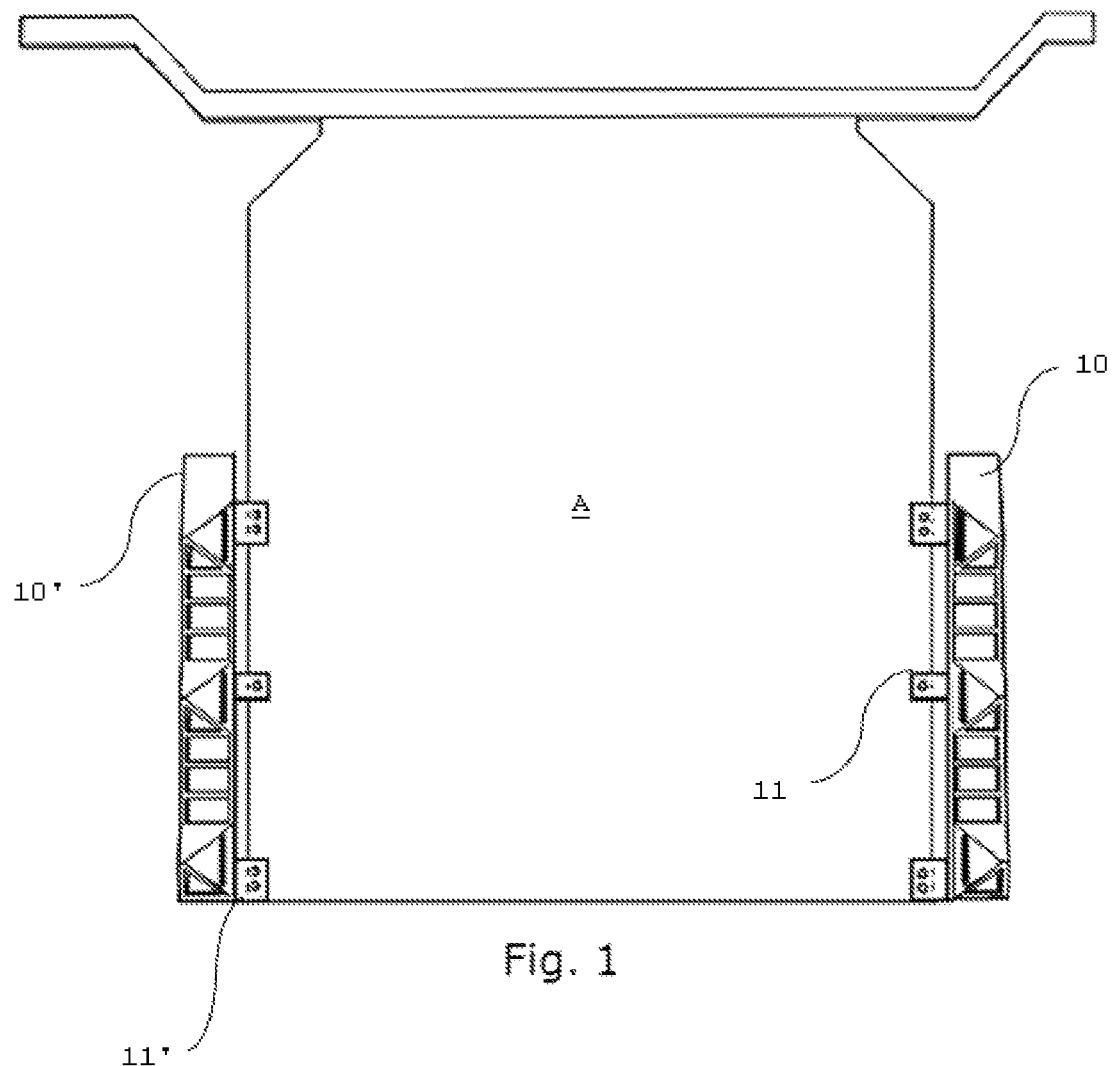
FIG. 1 shows a front view of an embodiment of the optimizing system of the invention with two optimizing devices.

For a better explanation of the invention a description of a preferred embodiment will be made in relation to the Figures, wherein:

FIG. 1 shows a front view of a preferred embodiment of the electrodeposition optimizing system of the invention formed by two optimizing devices (10, 10') installed on each side of an anode plate (A) fixed to it by means of extended wedge areas (11, 11') projecting from the front face of the device. Although in FIG. 1 three extended wedge areas are shown, one towards each end of the device (upper and lower) and one towards the central part of the device, alternative embodiments can present a continuous extended wedge area, that is, where the entire edge of the anode plate is housed. The extended wedge areas allow to maintain a separation between the edge of the anodic plate and the device, increasing the zones of the electrolyte free flow.

Figures 2A, 2B, 2C:
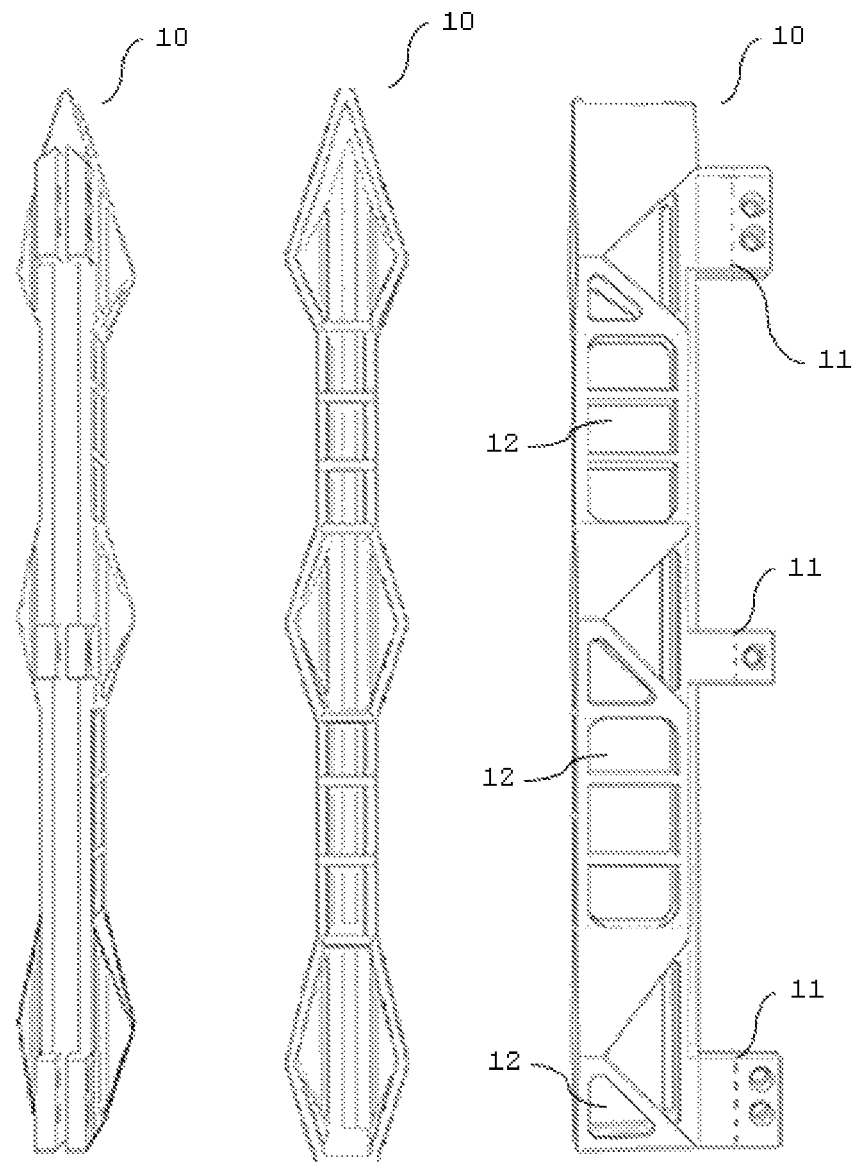
FIGS. 2a, 2b and 2c show in a plane the frontal, rear and lateral projections, respectively, of the optimizing device of FIG. 1.

FIGS. 2a, 2b and 2c show a preferred embodiment of the optimizing device (10) according to FIG. 1, with the extended wedge areas (11), unfolding the front, rear and side projections in one plane, respectively. In FIGS. 2a and 2b it is possible to appreciate in greater detail the lateral profile of the optimizing device (10), presenting sections of different widths that seek to promote the circulation of the electrolyte and, thus, to maximize the electrodeposition on the cathode while maintaining a gap between adjacent electrodes. On the other hand, in FIG. 2c it is possible to appreciate in greater detail the configuration of the side walls of the optimizing device (10), which has large openings (12) in all the sections that form its extension. In addition, the extended dimension of the extended wedge areas (11) can be seen, which project from the front face of the optimizing device (10).

Figure 3:
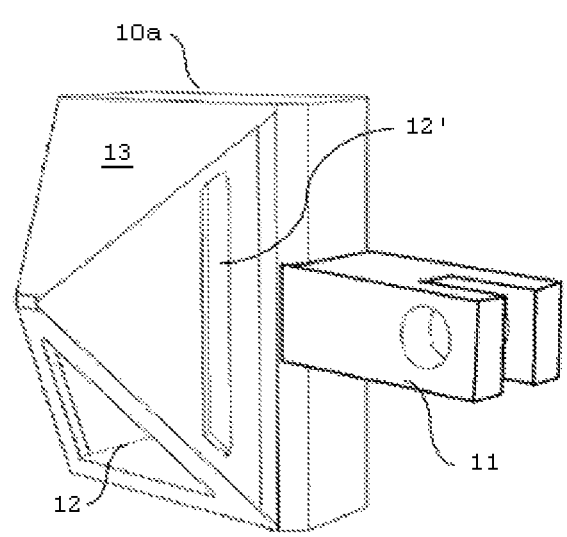
FIGS. 3 and 3a show an isometric view of a central separation section of the optimizing device of FIG. 1 and a sectional view of its cross section, respectively.
Figure 3A:
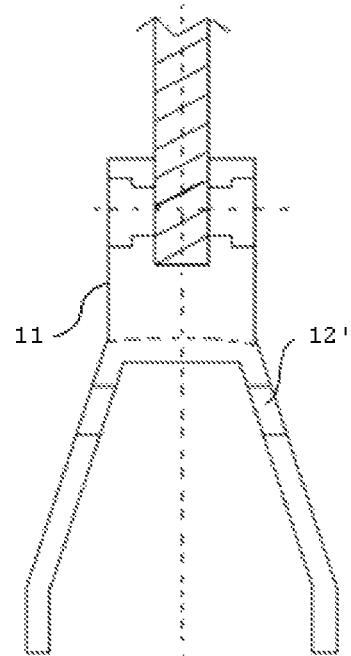

FIGS. 3 and 3a show an isometric view of the separation section of the optimizing device (10) of FIG. 1 according to a preferred embodiment of the invention, together with a cross-sectional view of said device, both with the extended wedge area (11), respectively. In particular, FIGS. 3 and 3a show a central separation section (10a) of the optimizing device that has inclined walls (13) ensuring a correct separation between adjacent electrodes. In FIG. 3 it can be appreciated that said section of the device, in addition to inclined walls, comprises an extended wedge area (11) and openings (12, 12') for the electrolyte free flow participating as an electrode straightening element. In particular, it is possible to appreciate that the central separation section of the optimizing device shown in FIGS. 3 and 3a comprises a combination of two types of openings, a larger opening (12) and a smaller opening (12'). The smaller opening (12') is arranged in the vicinity of the extended wedge area (11) maximizing the electrolyte flow in the vicinity of said wedge area. On the other hand, the inclined walls in addition to promoting the circulation of the electrolyte with the fewest possible interruptions, promote a wider U-shaped cross-sectional configuration at its rear, at least in part of the extension of the optimizing device. Indeed, FIG. 3a shows said configuration of inclined walls which promote the separation between adjacent electrodes.

Figure 4:
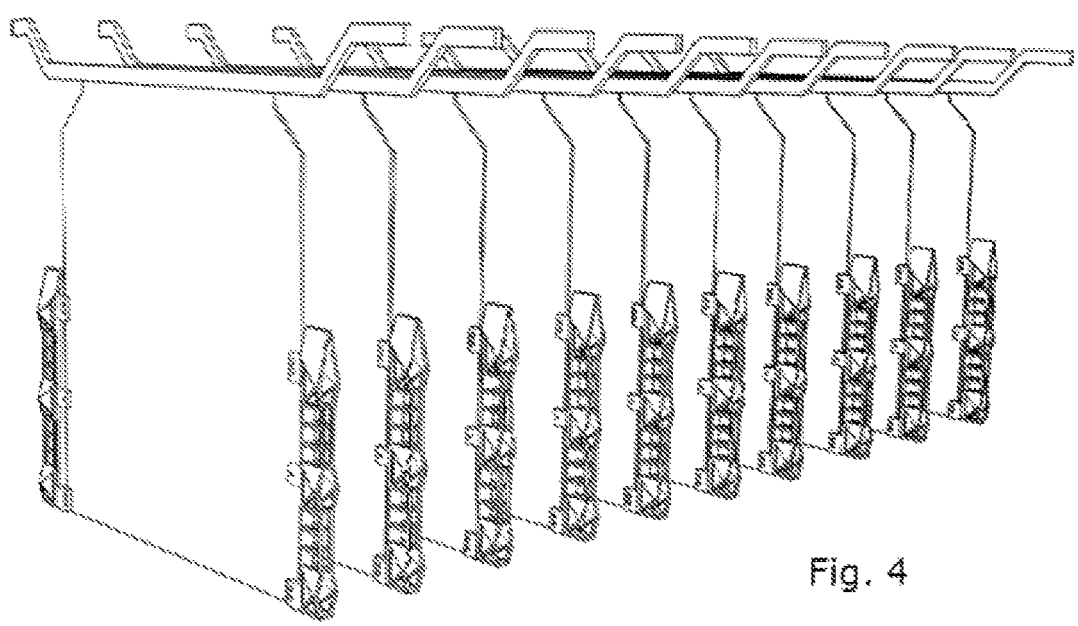
FIG. 4 shows an isometric view of a set of anodes of a cell, which have the optimizing system of the invention installed according to FIG. 1.

FIG. 4 shows an isometric view of a set of anodes of a cell that have the optimizing system of the invention installed according to a preferred embodiment, corresponding to the one shown in FIG. 1.

Figure 5:
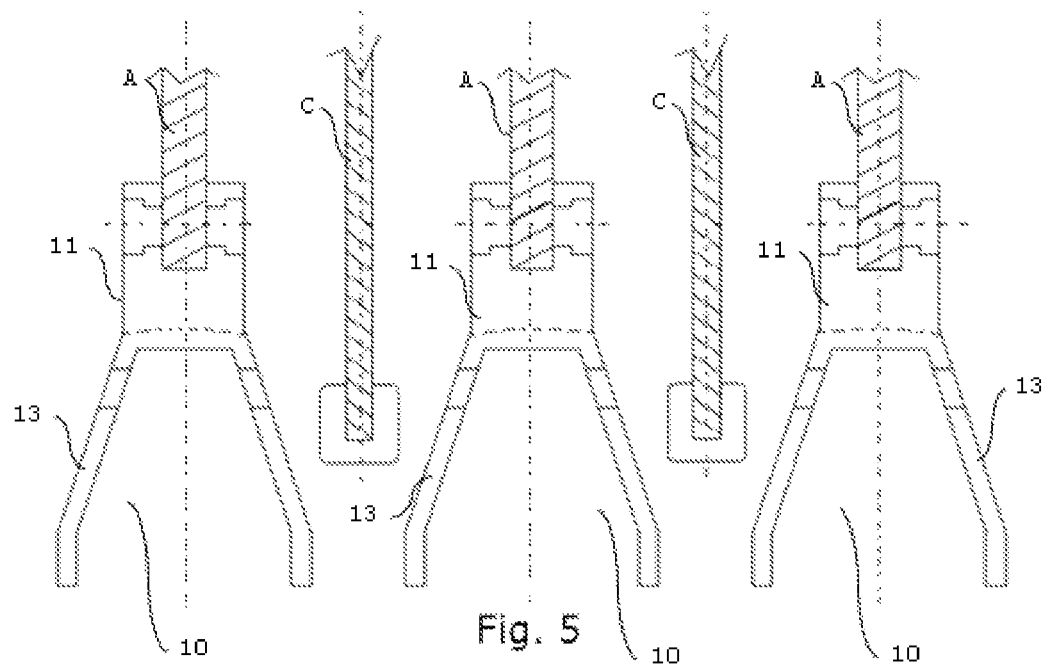
FIG. 5 shows a diagram of a sectional view of how the optimizing device of FIG. 1 acts between anodes and cathodes.

FIG. 5 shows a diagram of a sectional view of how the optimizing device (10) acts with respect to the spacing between anodes (A) and cathodes (C) with the extended wedge area (11). In said Figure it is possible to appreciate how the separation sections with inclined walls (13) of the optimizing device (10) configure respective separations between adjacent electrodes.

Figure 6:
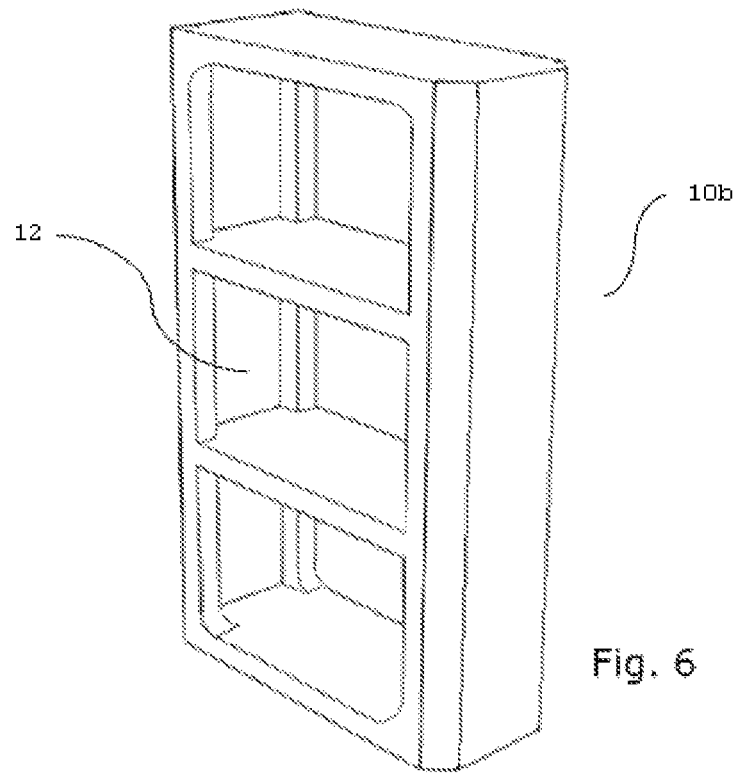
FIG. 6 shows an isometric view of a central circulation section of the body of the optimizing device of FIG. 1.

FIG. 6 shows an isometric view of a circulation section (10b). According to one embodiment, said circulation section is rectangular with parallel walls with a smaller width cross-section with respect to the separation section, with large openings (12) to maximize the passage of the electrolyte flow. Said circulation section (10b) with large openings (12) is located in the device body immediately adjacent to a separation section of the optimizing device, according to one embodiment thereof, for example, as shown in FIG. 3.

FIG. 7 shows a full isometric view of the optimizing device (10) with the extended wedge areas (11), according to one embodiment of the optimizing device of the invention. In said FIG. 7, the combination of separation sections (10a) of inclined walls with circulation sections (10b) of parallel walls in the device body can be seen, said sections alternated along its length. In addition, in the Figure it can be seen that the upper and lower separation sections (10a') which are arranged towards the ends of the optimizing device (10) may be different from the central separation section (10a) which is arranged towards the center of such device. However, said sloped sections can also be equivalent.

FIG. 8 shows an isometric view of the upper separation section (10a') of the device body which has two inclined planes (13) along which the adjacent cathodes slide vertically during the entry/removal operations to/from the electrolytic cell. Said upper separation section (10a') of the device body incorporates anode spacer elements (14) which correspond to the widest portion of the walls or inclined planes (13), fastening elements (15) with an extended matching area (11) and openings (12) for the passage of the electrolyte participating as a straightening element of the electrode.

FIG. 9 shows an isometric view of the lower separation section (10a') of the device body which has two inclined planes (13) facilitating the entry of the electrodes into the cells, in particular, of the anodes that the installed device has. Said lower separation section (10a') of the device incorporates anode spacer elements (14) which correspond to the widest portion of the walls or the inclined planes (13), fastening elements (15) with an extended matching area (11) and openings (12) for the passage of the electrolyte, participating as a straightening element for the electrode.

As can be seen by reviewing FIG. 7 in contrast to the device sections depicted in FIGS. 3, 6, 8 and 9, presented on the sheet next to FIG. 7 for ease of comparison, the body of the optimizing device of the invention is formed by different body sections, an upper separation section as shown in FIG. 8, a lower separating section as shown in FIG. 9, a central separating section as shown in FIG. 3, and two central circulation sections as shown in FIG. 6. According to the embodiment, the upper, central, and lower separation sections have sloped walls, extended wedge areas, and openings for electrolyte flow. According to the embodiment, the central circulation sections have parallel walls and large openings for the flow of electrolyte.

Figure 10:
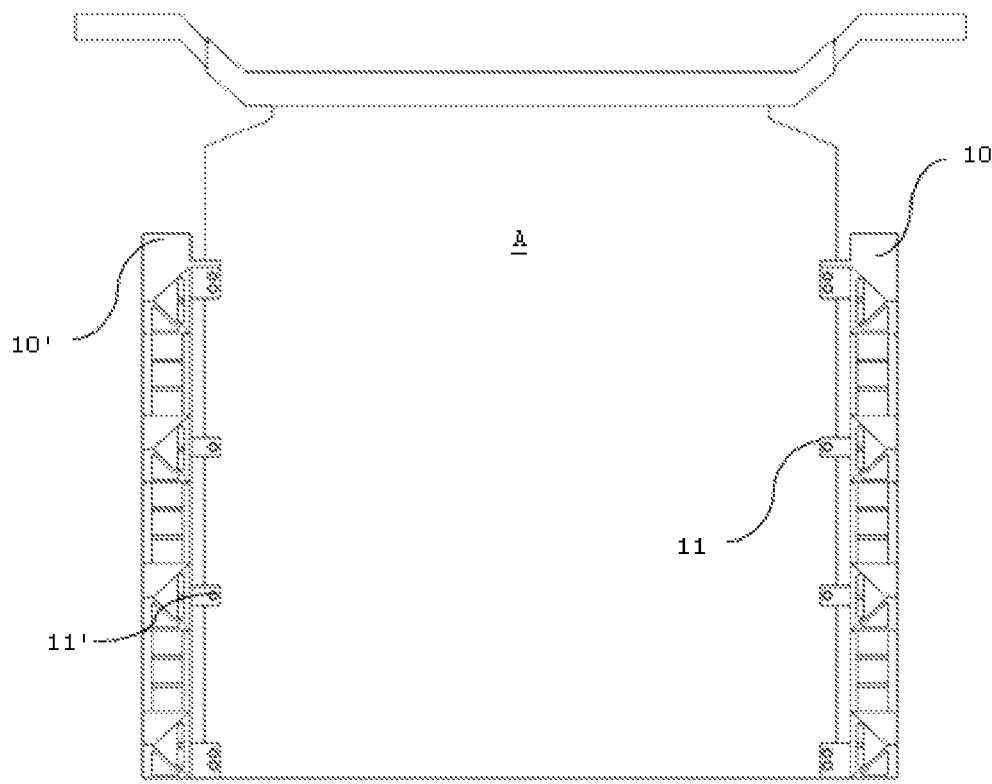
FIG. 10 shows a front view of an electrode presenting two optimizing devices of the invention with a first elongated configuration.

FIG. 10 shows a front view of an anode (A) presenting two optimizing devices of the invention (10, 10') with an elongated configuration. Compared to the extension of the device shown in FIG. 1, the device of FIG. 10 has an elongated extension in a fraction of the body, said fraction composed of the body sections depicted in FIG. 3 and FIG. 6. This example shows that the construction of the device is easily adaptable to different lengths, implementing its extension by adding corresponding sections of the body.

In this context, the addition of the body sections is done at the level of a manufacturing mold or by means of some suitable shaping process considering that the preferred material of the optimizing device is plastic.

Figure 11:
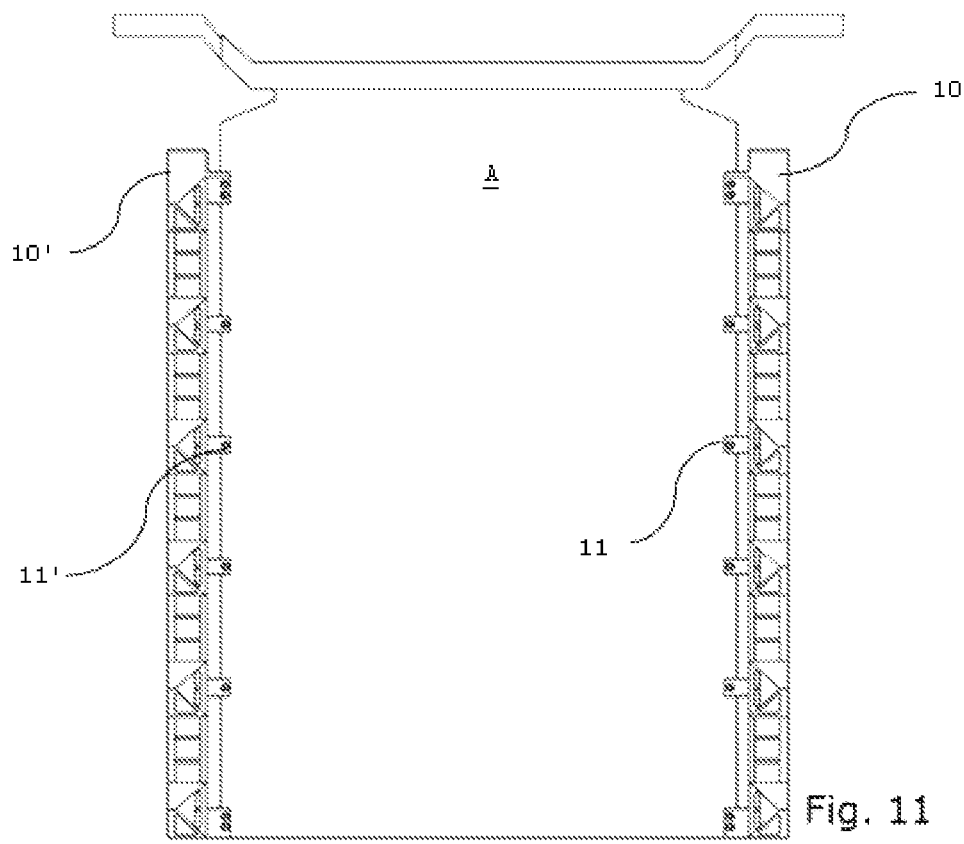
FIG. 11 shows a front view of an electrode presenting two optimizing devices of the invention with a second elongated configuration.

FIG. 11 shows a front view of the elongated device in more fractions of the body composed of the sections shown in FIG. 3 and FIG. 6. Through this configuration it is possible to achieve a length of device that covers 100% of the extension of the anode lateral edge (A). FIG. 11 exemplifies the advantage of the device with respect to its construction being possible to alternate body sections, in particular, circulation sections and central separation sections to obtain device configurations of different extension.

FIG. 12 shows a full isometric view of an optimizing device (10) with non-extended wedge areas (11a), that is, wherein the edge of the anodic plate is arranged practically in contact with or very close to the front face of the optimizing device (10).

Similar to FIG. 8, FIG. 13 shows an isometric view of the upper separation section of the device body that has two inclined planes along which the cathode slides vertically during the entry/removal operations to/from the electrolytic cell. Said upper separation section of the device body incorporates anode spacer elements, fastening elements with a non-extended wedge area (11a) and openings for the passage of the electrolyte, participating as an electrode straightening element. Similar to FIG. 3, in FIG. 14 a central separation section of the device can be seen which, in addition to inclined walls, also comprises a non-extended wedge area and openings for the free flow of electrolyte, participating as an element electrode straightener. In the same way, FIG. 15 shows an isometric view of the lower separation section of the device body that has inclined planes, which facilitate the entry of the electrodes into the cells, in particular, of the anodes that the installed device has. Said lower separation section of the device incorporates anode spacer elements, fastening elements with a non-extended wedge area (11a) and openings for the passage of the electrolyte, participating as an electrode straightening element.

As can be seen by reviewing FIG. 12 in contrast to the device sections depicted in FIGS. 13, 6, 14 and 15, presented on the sheet next to FIG. 12 for ease of comparison, the body of the optimizing device of the invention is formed by different body sections, an upper separation section as shown in FIG. 13, a lower separating section as shown in FIG. 15, a central separating section as shown in FIG. 14, and two central circulation sections as shown in FIG. 6. According to the embodiment, the upper, central and lower separation sections have sloped walls, non-extension wedge areas and openings for electrolyte flow. According to the embodiment, the central circulation sections have parallel walls and large openings for the flow of electrolyte.

Figure 16:
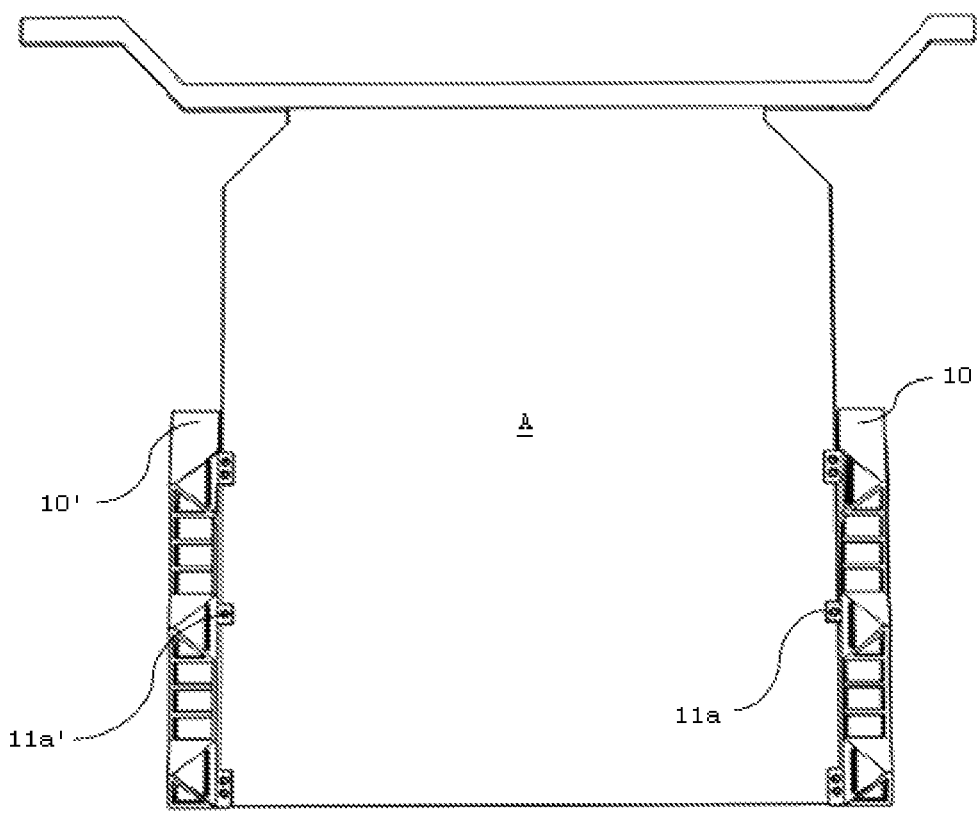
FIG. 16 shows a front view of an electrode that has a preferred embodiment of the optimizing system of the invention according to FIG. 12.
Figure 17:
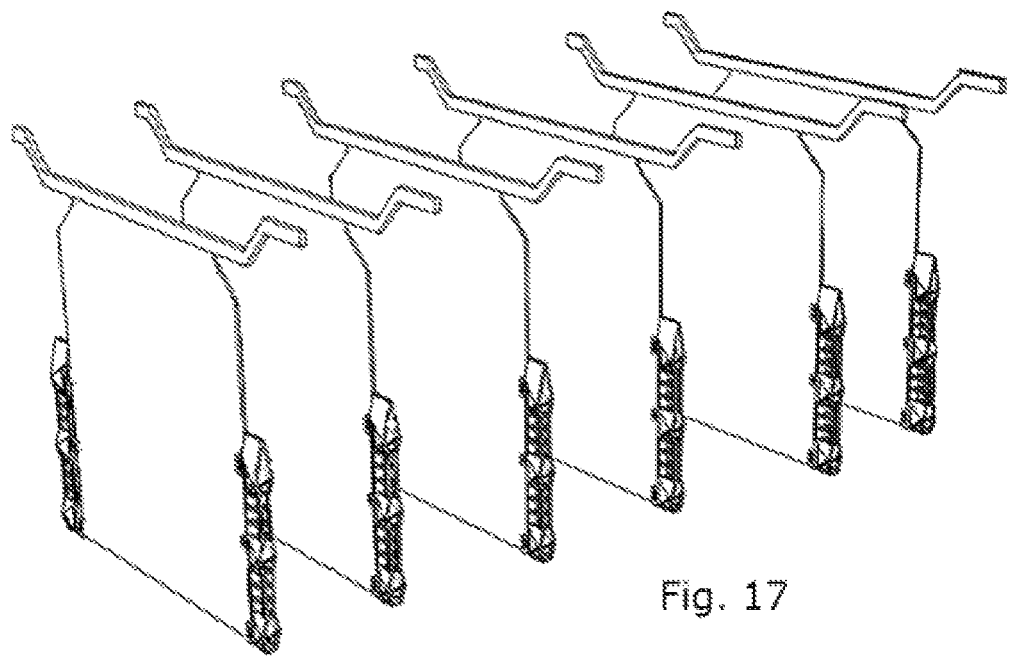
FIG. 17 shows an isometric view of a set of anodes of a cell that have the optimizing system of the invention installed according to FIG. 12.
Figure 18:
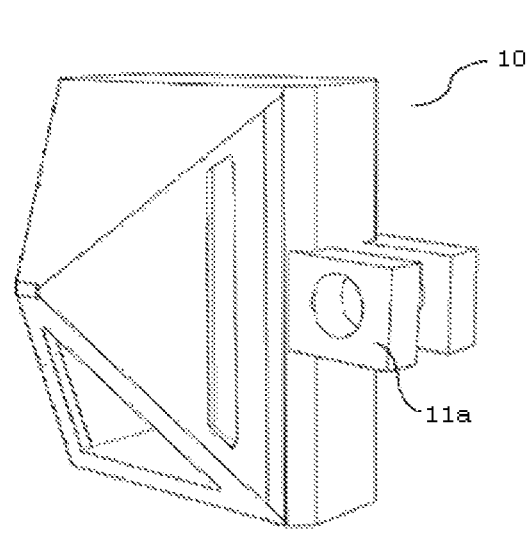
FIGS. 18 and 18a show an isometric view of a central separation section of the optimizing device of FIG. 12, and a sectional view of its cross section, respectively.
Figure 18A:
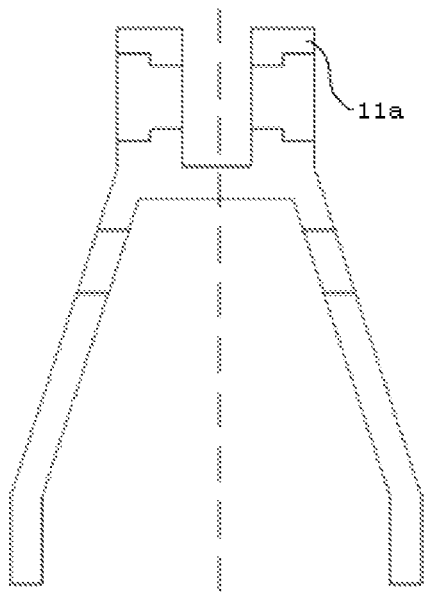

FIG. 16 shows a front view of an anode (A) that has a preferred embodiment of the electrodeposition optimizing system of the invention with the non-extended wedge area (11a, 11a'). In this context, FIG. 17 shows an isometric view of a set of anodes of a cell that have the preferred optimizing system of the invention installed according to one embodiment with a non-extended wedge area (11a, 11a') corresponding to FIG. 16.

Figure 19:
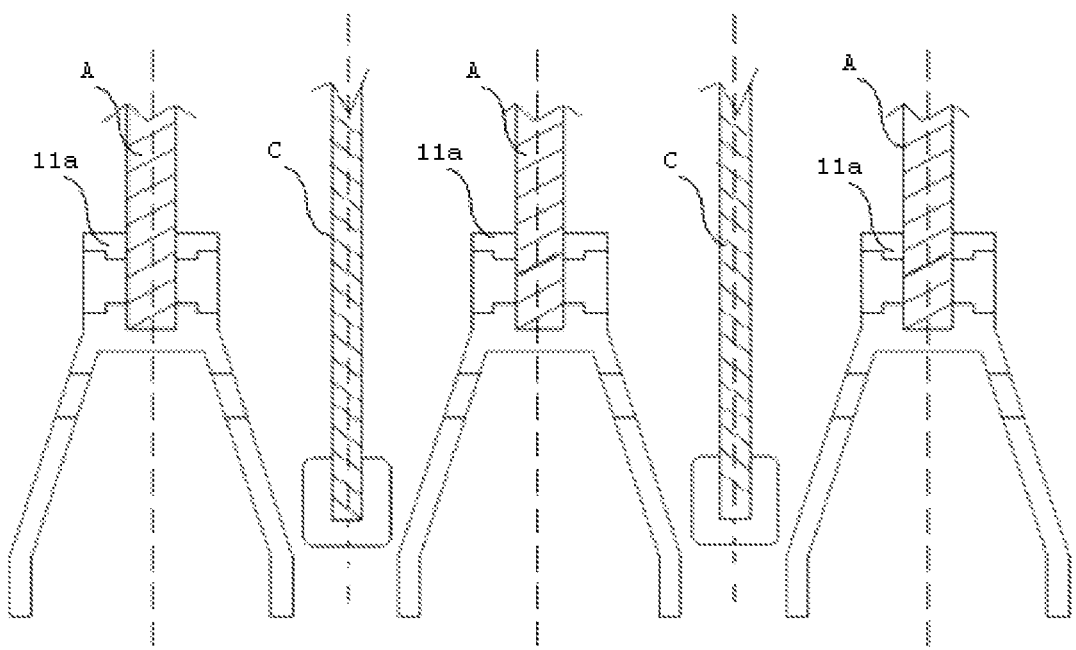
FIG. 19 shows a diagram of a sectional view of how the optimizing device of FIG. 12 acts between anodes and cathodes.

Similarly to FIGS. 3 and 3a, FIGS. 18 and 18a show an isometric view of the separation section (10a) of the optimizing device according to a preferred embodiment of the invention, together with a sectional view of the cross section of said device, both with the non-extended wedge area (11a), respectively. On the other hand, FIG. 19 shows a diagram of a sectional view of how the optimizing device acts with respect to the distance between anodes and cathodes with the non-extended wedge area.

Figure 20:
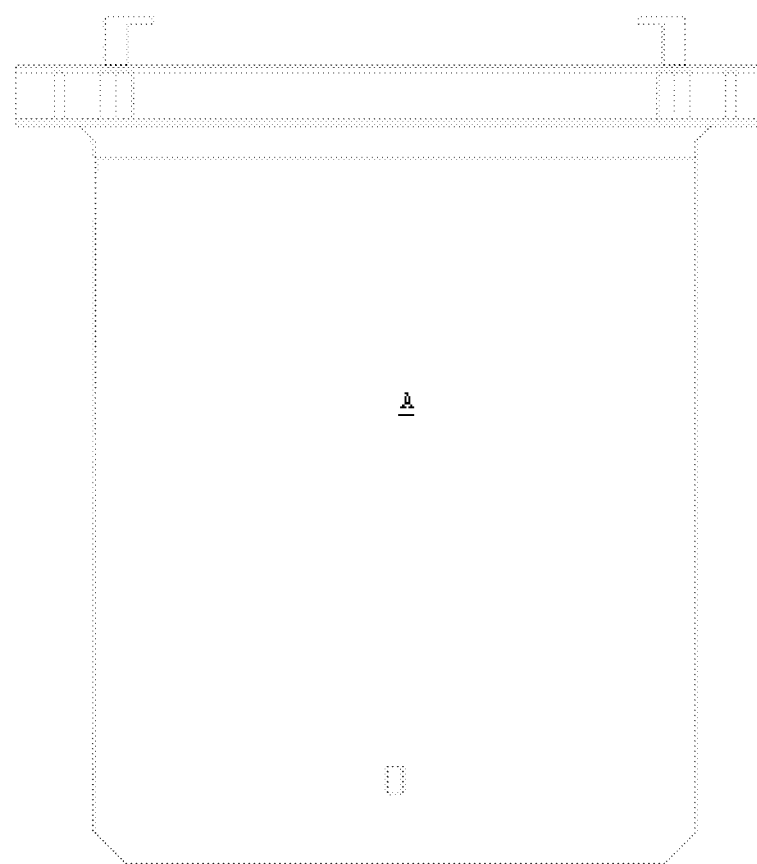
FIG. 20 shows a diagram of an anode with angled lower corners.

Finally, the present invention comprises an additional embodiment in which, in order to ensure the rigidity of the anodic plate, it comprises an additional section called the corner section. As shown in FIG. 20, in some Electrowinning Plants the anodic plates (A) are not always straight in their lower corners, and due to the design of the cell and the processes, it is preferred that the corners of the anodic plates end at an angle, preferably 45°, as shown in FIG. 20. After a period of operation the anodic plates are subject to very intense wear due to corrosion especially in the corners which prematurely thin them with respect to the body which is reflected in anodes with crooked anodic plates in their corners being the main focus of short circuits that bring with them malformed deposits or protuberances in the corners of the cathodes to be harvested.

Figure 21:
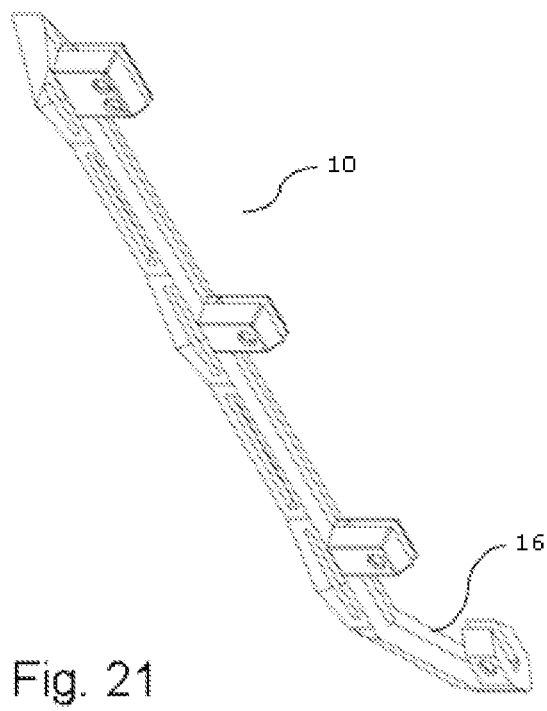
FIG. 21 shows an isometric view of an optimizing device including a corner section.
Figure 22:
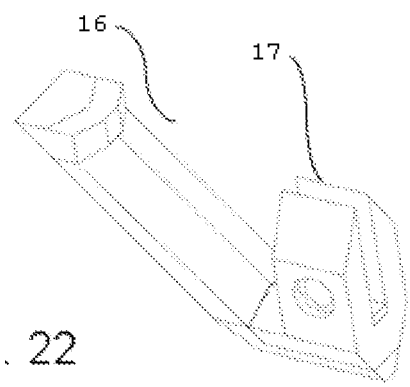
FIG. 22 shows a detail of the corner section of the optimizing device of FIG. 21.
Figure 23:
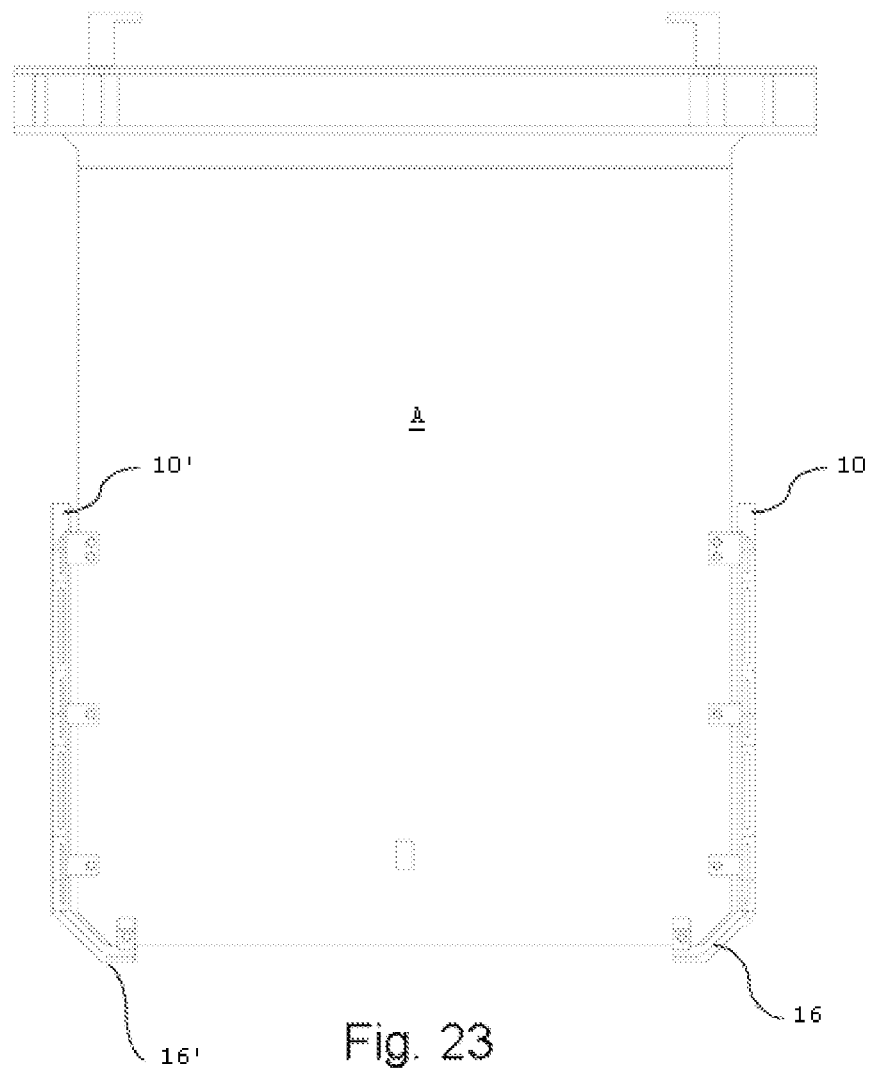
FIG. 23 shows the optimizing device of FIG. 21 installed on the anode of FIG. 20.

In order to avoid this, the optimizing device (10) may comprise in its lower part a corner section (16) with an angular shape, as shown in FIG. 21, so as to protect the anode plate at the corners. Said corner section may also comprise a wedge area (17) in the form of a U-shaped channel closely receiving the anode at its lower edge. The walls of the wedge area (17) in the form of a channel, in its upper part, have a sliding angle that prevents the accumulation of sludge detached from the electrode due to corrosion. In FIG. 22 the corner section (16) with the wedge area (17) can be seen in greater detail and in FIG. 23 two optimizing devices (10, 10') with corner sections (16, 16') installed on an anode (A) can be seen.

In this way, any approach between anodes and cathodes is avoided eliminating short circuits, consequently, cathodes of excellent physical and chemical quality are obtained. Another benefit is that the anodes would extend their useful life, since they are currently being discharged because the corners become thinner, lose thickness prematurely and generate problems in advance, so with this device the useful life of the anode would be maximized.

The invention claimed is:

1. An optimizing device for electrodeposition of metals with multiple openings which maximizes a passage of electrolyte flow without altering the electrodeposition which is suitable for different current density ranges and which straightens electrodes avoiding loss of current due to short circuits that occur between anodes and cathodes, wherein the device comprises:
   a single body comprising with a skeletal structure formed by different body sections comprising at least one separation section with inclined side walls followed by at least one circulation section with walls that configure a cross section narrower than the at least one separation section repeating this configuration of body sections alternately throughout a length of the device; where all of the inclined side walls of the at least one separation section and the walls of the at least one circulation section have the multiple openings of various shapes that facilitate the passage of the electrolyte flow, and where all or at least some of the side walls of the at least one separation section and the walls of the at least one circulation section come together on the front face of the device forming a wall that supports wedge areas arranged to accommodate the peripheral edge of an electrode, straightening the electrode in all its extension and separating the electrode from adjacent electrodes.

2. The device according to claim 1, wherein the at least one separation section has a U-shaped cross section wider at its rear, and in that the at least one circulation section is formed by parallel side walls.

3. The device according to claim 1, wherein the device with the multiple openings and a system comprising the device are configured to work in an entire range of current densities for the electrodeposition of the metals.

4. The device according to claim 1, wherein the wedge areas are configured to be distributed along an entire front extension of the device.

5. The device according to claim 1, wherein the wedge areas comprise an extended wedge area which extends along most of the front extension of the device or along an entire length of the front extension of the device.

6. The device according to claim 1, comprising fixing holes located in at least one of the wedge areas along an extension of said at least one of the wedge areas, wherein the fixing holes allow the electrode housed in said at least one of the wedge areas to be fixed via fixing media.

7. The device according to claim 1, comprising a clamp system by which the device is fixed to the electrode comprising an anode, wherein the clamp system is located in the wedge areas along an extension of the electrode.

8. The device according to claim 1, wherein the wedge areas project from the junction of the side walls outside of the device in an extension of the electrode.

9. The device according to claim 1, wherein a distance between a wall that joins the side walls of the device and the edge of the electrode is configured to be variable to allow greater or less passage of the electrolyte flow.

10. The device according to claim 1, wherein a front wall that joins the side walls of the device is in contact with the edge of the electrode comprising an anode, throughout the extension of the electrode formed with non-extended wedge areas.

11. The device according to claim 1, comprising at least one end that comprises inclined planes arranged on the inclined side walls which facilitate sliding with respect to adjacent electrodes.

12. The device according to claim 11, comprising two ends having inclined planes arranged on the side walls of the device.

13. The device according to claim 1, wherein the at least one separation section defines a cross section in the form of a "U" wider at its rear with an equidistant angle device.

14. The device according to claim 1, wherein the at least one circulation section defines a cross section in the shape of a "U" with a width less than the at least one separation section which facilitates the passage of the electrolyte.

15. The device according to claim 1, wherein each of the wedge areas has a square or rectangular section.

16. The device according to claim 1, wherein the wedge areas have beveled ends.

17. The device according to claim 1, wherein the wedge areas are is discontinuous along a front extension of the device, the wedge areas comprise openings that expose a surface of the electrode.

18. The device according to claim 1, wherein the wedge areas comprise a longitudinal extension of at least 50% of a length of a longest side of the electrode in which it is installed, between 50 and 100% of said length.

19. The device according to claim 18, wherein an extension of the wedge areas comprises an entire length of a larger side of the electrode in which it is installed.

20. The device according to claim 1, wherein the device is made entirely of plastic.

21. The device according to claim 1, wherein the length of each device can grow modularly, incorporating corresponding body sections, alternated between section with inclined walls and rectangular section with parallel walls until reaching a desired length.

22. The device according to claim 1, comprising a corner section arranged towards a lower end of the device to receive lower corners of anodes that have angled corners.

23. An electrode optimizing system that prevents the occurrence of short circuits that are produced between anodes and cathodes during electrodeposition processes, comprising,
- at least one optimizing device according to claim 1, installed on the peripheral edge of an electrode, on the side of an anode straightening the electrode as well as providing an equidistant separation between adjacent electrodes.

24. The system according to claim 23, comprising at least two optimizing devices with extended wedge areas installed on both sides of an electrode.

25. The system according to claim 23, comprising at least two optimizing devices with non-extended wedge areas installed on both sides of an electrode.

* * * * *